Dec. 28, 1937.  J. J. SEIP  2,103,828
PROCESS OF AND APPARATUS FOR CLARIFYING LIQUIDS
Original Filed Dec. 8, 1932
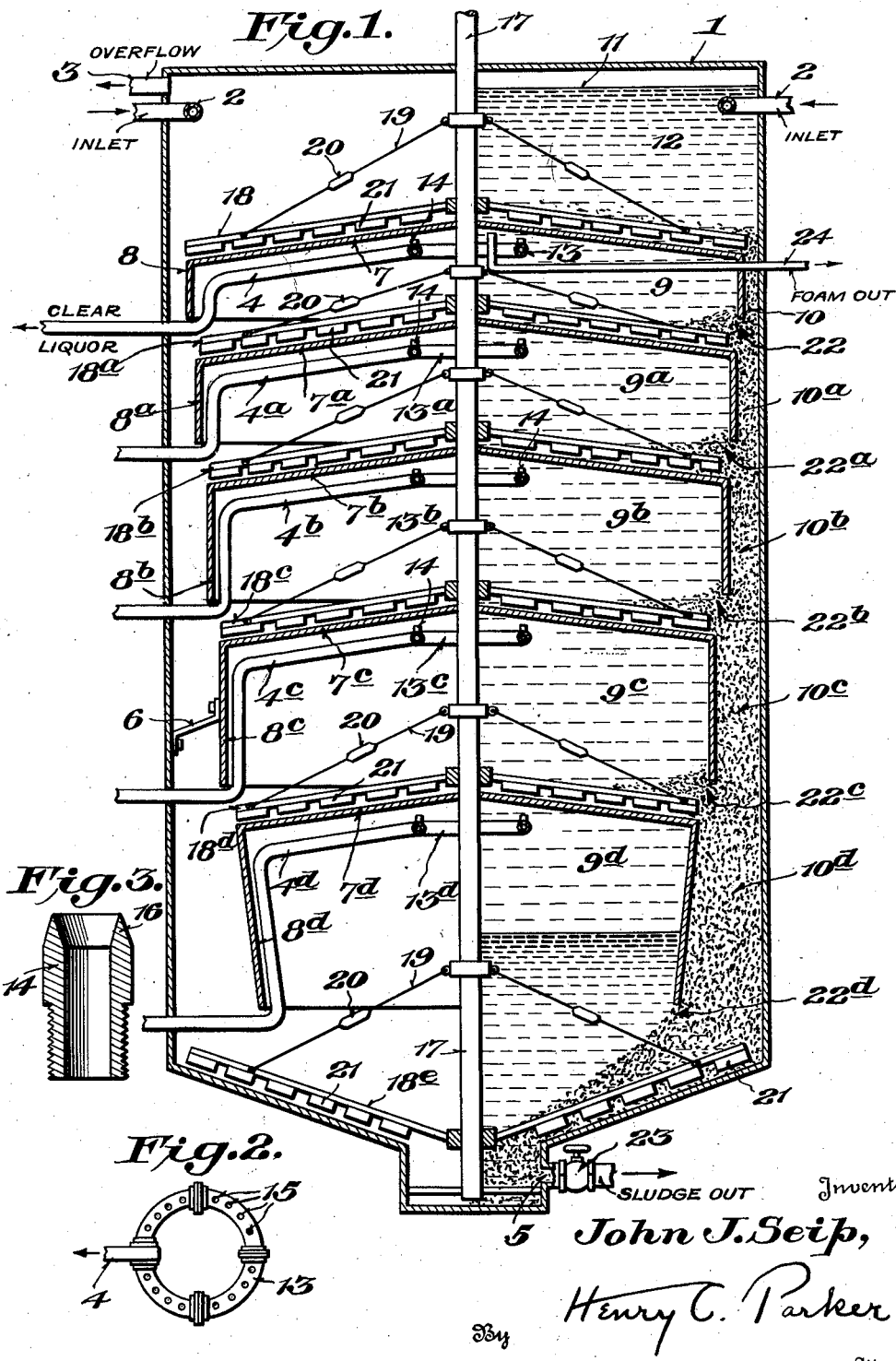

Patented Dec. 28, 1937

2,103,828

UNITED STATES PATENT OFFICE 2,103,828

PROCESS OF AND APPARATUS FOR CLARIFYING LIQUIDS

John J. Seip, Allentown, Pa.

Application December 8, 1932, Serial No. 646,346
Renewed August 26, 1937

7 Claims. (Cl. 210—55)

This invention relates to process of and apparatus for clarifying liquids; and it comprises a process and apparatus suitable for clarifying liquids from suspended solids, such as are encountered in the defecation of cane and beet sugar juices, for example; the said process comprises introducing a stream of liquid to be clarified into a stilling zone of large volume, passing said liquid downwardly through a plurality of peripheral discharge zones, usually of increasing cross sectional area downwardly, passing portions of said liquid upwardly through a plurality of central clarifying zones, usually of increasing depth from zone to zone downwardly, to centrally located clear liquor discharges and mechanically sweeping precipitated solids from beneath said discharge and said clarifying zones; the said apparatus comprises a tank, usually cylindrical in shape, an inlet for liquids containing suspended matter at the top of said tank, a plurality of bell shaped members defining an upper stilling zone, a plurality of peripheral discharge zones, usually of increasing cross sectional area downwardly, and a plurality of central clarifying zones, at least one of said bell shaped members usually being provided with a restricted mouth, thereby producing an adjacent discharge zone of increasing cross section downwardly, means for withdrawing clear liquor from said clarifying zones and mechanical means for sweeping solids from the tops of said bell shaped members into said discharge zones at the bottom of said tank; all as more fully hereinafter set forth and as claimed.

Multiple tray clarifiers have been known in the art for 20 years or more. During this period a large number of different designs have been proposed. One of the earliest types proposed was a so-called "counter-flow" type employing a plurality of dished trays each provided with a central discharge passageway. In this type of clarifier the solids are propelled in a direction opposite to the flow of liquid to the clear liquor draw-offs; this leading to the name of "counter-flow" clarifier. More recently different types of apparatus utilizing the parallel flow principle have come into use. These clarifiers are provided with annular trays having both central and peripheral discharge zones, the clear liquor exits being located beneath the trays. The solids precipitated on the trays are propelled along their surfaces in a radial direction towards the clear liquor exits. The trays are provided with at least one depending flange, the clear liquor discharges usually being located adjacent to these flanges.

It has been urged that the parallel flow principle is inherently superior to that of the counter-flow. It has been argued that the propulsion of the solids counter to the flow of the liquid unavoidably tends to cause the resuspension of the solids. I have found, however, that this is not necessarily true.

I have found that, if the velocity of the liquid flowing counter to the propulsion of the solids is made sufficiently small, the tendency for resuspension of the solids is largely eliminated if not entirely overcome. I have found that the easiest method of accomplishing this desired reduction in velocity is to employ a peripheral discharge zone instead of the central down-take formerly employed on clarifiers making use of the counter-flow principle. In so doing I have eliminated the central down-take completely.

The velocity of flow through the entrance to the clarifying zones of the present invention, that is through the peripheral annular openings between the tops of the trays and the depending peripheral flanges of the trays above, is a small fraction of the corresponding rate of flow used in previous countercurrent clarifiers. The rates of flow for a given rate of discharge are, of course, proportional to the respective radii of the openings, assuming the same distance between trays and flanges. In a 20 foot clarifier I have found that the ratio of rates may be made of the order of 10 to 1 or thereabouts.

While the velocity of flow in the counter-flow clarifiers of the prior art is sufficient to obtain an appreciable, and sometimes detrimental amount of resuspension of sediment, I have found that the velocities of flow occurring at the entry of the clarifying zones in my improved clarifier are sufficiently low as to provide a substantially undisturbed discharge of sediment, even though this discharge may be counter to the flow of liquid. Thus, I have eliminated the one disadvantage of prior art counter-flow equipments while retaining all the inherent advantages thereof.

In all types of clarifiers employing a plurality of trays the bulk of the sediment is deposited on the trays close to the entry of the clarifying zones. In the counter-flow type of clarifier this sediment is removed by moving it towards the nearest exits, namely those through which it entered the clarifying zones. The sediment is thus, at least theoretically, moved the shortest distance possible and most directly from its point of deposit to the sludge exit. In contrast to this, in the parallel flow equipment, the sediment deposited close to the entrance of the clarifying zones is propelled across substantially the entire width of the trays towards the openings most remote from the points of deposit. This results in a considerable accumulation of sediment within the clarifying zones.

A second inherent advantage in the counter-flow clarifiers is due to the fact that there is usually a greater distance between the clear liquor discharges and the entrances to the clarifying zones than in the parallel flow clarifiers, due to the necessity of having both central and peripheral openings in the trays of the latter type. This feature provides a longer time and a greater opportunity for the solids to precipitate without being carried over into the clear liquor. In the prior types of counter-flow clarifiers the inherent advantages of this type were more than counterbalanced by the difficulties arising from resuspension of the deposited sediment.

My new design of counter-flow clarifier possesses all the advantages inherent in a counter-flow type. In addition it possesses several advantages characteristic of the new design. I have found, for example, that the distances from the entrances of the clarifying zones to the clear liquor discharges can be made even greater in my new type than in the prior type of counter-flow clarifier. This is due to the fact that, when a central down-take is employed, this must necessarily have a width in the direction of the radius of several times that employed in the peripheral discharge zones used in the present invention. In my design the distance between the upper tray flange and the tank wall can be made of the order of about 2 inches. This is in contrast to a radius of at least about 18 inches for the central down-take of a counter-flow clarifier of the prior art. This represents a gain of approximately 16 inches in the distance between the entrance to the clarifying zones and the clear liquor draw-offs.

As mentioned previously, the great majority of solids deposit on the trays of a clarifier close to the entrance of the clarifying zones. In the prior art counter-flow type of clarifier this precipitation took place within a comparatively small area adjacent to the central down-take. The depth of the deposit was therefore rather large. And during the propulsion of the solids to the discharge zone, the solids converged centrally, thus piling up to a considerable depth before finally being pushed off the central edge of the tray. In my design the tray area upon which the bulk of solids precipitate is from 8 to 10 times as large. My new design provides the largest possible settling area. Moreover, during the propulsion of the solids toward the peripheral discharge of my trays the settling area increases and there is no tendency for the solids to heap up. It is of course obvious that the greater the depth of solids at the entrance to the clarifying zones, the greater the tendency for resuspension. In my design, this tendency is substantially eliminated, due not only to the decreased velocity of flow of the liquids but also to the smaller piling up of solids at this point.

During the operation of my new clarifier I have found still other advantages in my new design, which were probably masked or overcome by the resuspension of solids in the prior counter-flow type. I have found that there is a somewhat smaller loss of pH during the clarification of sugar juices for example, that the muds have an improved filtrability and that the flocs have less tendency to break up. A clarifier of my new design has an appreciably higher capacity than that of previous types. I attribute these advantages to the shorter time of contact of the muds with the liquid which is being clarified. The muds are propelled quickly and expeditiously by the shortest and most direct route to the sludge draw-off. There is less recontamination of muds through successive recirculation. The clear liquor discharge collectors are located in a quiet zone at the greatest possible distance from the intake and consequently free from all disturbing influences. This minimizes the injurious counter and eddy currents produced in the prior counter-flow clarifier. By the use of special collecting nipples mounted in the clear liquor collector I am enabled to produce a weir effect providing a quiet, undisturbed drawing off of clear liquor without the "suction effect" usually encountered in a pipe draw-off. This prevents any suspended material from being drawn upwardly by discharge eddies.

Other advantages of my new design will become evident in the further discussion, during which reference will be made to the accompanying drawing which shows, more or less diagrammatically, an assemblage of apparatus elements within the purview of my invention and useful in the process of my invention. In this showing Fig. 1 is a vertical central section of one form of my clarifier.

Fig. 2 is a plan view of one form of clear liquor discharge collector, while

Fig. 3 is a vertical section of a draw-off nipple advantageously employed in said collector.

In the several figures various structural elements are represented by the same reference numerals.

The apparatus of my invention comprises a tank 1, usually cylindrical in shape, although this can be made of square or of other convenient cross section if desired. This tank is provided with intakes 2 for liquids to be clarified, with an overflow 3 for scum, for example, with clear liquor draw-offs 4, 4a, 4b etc., and with a sludge outlet 5. Supported within the tank by brackets 6 or other means are a series of belled or crowned trays 7, 7a etc. These trays are provided with depending peripheral flanges 8, 8a etc., which form, within the confines of the trays above and below, clarifying zones 9, 9a etc. The flanges 8, 8a etc., also define vertical discharge zones 10, 10a etc., between themselves and the wall of the tank. The upper tray is placed at some distance below the liquid level 11 in order to provide a stilling zone 12 of substantial volume.

Beneath each of the trays at the center there are mounted collecting rings 13, 13a etc., connected with the clear liquor draw-offs. These rings are provided with collecting nipples 14; a section being shown in Fig. 3. These nipples are threaded into holes 15 (Fig. 2) in the upper surfaces of the collecting rings. The upper walls of the nipples are tapered at their orifices 16 (Fig. 3) in order to prevent collection of sediment at this point. The threaded portion of the nipples provides a convenient method of leveling the orifices of the nipples to provide equal discharge rates.

A central shaft 17 is provided for carrying the sweeps or scraper arms 18, 18a etc. The shaft is rotated by conventional gearing and source of power not shown. Rotation is at a very slow speed, usually not over 20 revolutions per minute as a maximum. The scraper arms are supported by ties 19 and turnbuckles 20. The sweeps are provided with rabbles or flights 21 which serve to move the precipitated solids over the surfaces of the trays and towards the peripheral discharge zones.

The operation of my apparatus is believed obvious from Fig. 1 which shows, on its right hand side, the distribution of solids in the clarifier during operation. The liquid to be clarified flows in at intakes 2, several of which may be located around the periphery of the tank. The liquid enters the stilling zone 12 and passes down the peripheral discharge passageway 10. Any solids deposited on tray 7 are also discharged through passageway 10, being propelled over to this point by means of sweeps 18 operated by shaft 17. The bulk of the sludge falls directly downwards through the successive discharge zones, 10a, 10b etc., which advantageously increase in cross section downwardly in order to provide larger discharge zones as the quantity of precipitated solids increases in bulk. A fraction of the liquid passing through discharge zone 10 enters into the clarifying zone 9, passing through the entrance 22, as indicated by the arrow. This liquor passes into zone 9 at an extremely slow rate due to the large cross section of entrance 22. A small amount of the lighter suspended solids are carried by this liquid into the clarifying zone. These are precipitated on tray 7a, the bulk being deposited close to entrance 22. The clarified liquor arises and finally passes out at the collecting ring 13. The solids deposited on tray 7a are rabbled in a direction towards opening 22 and are finally discharged into discharge zone 10a. The same process takes place in the successive trays beneath 7a; the clarified liquids passing out of the clarifying zones through the collecting rings and the solids precipitated within the clarifying zones being passed into the discharge zones below.

At the lower discharge zones the density of solids increases due to accretions from the successive trays. My design may accommodate itself to this increase by stepping the trays inwardly at the bottom. This provides discharge zones of increasing cross sectional area downwardly. In accordance with a copending application, Serial No. 633,520, filed September 16, 1932, I usually incline or taper the lowest flange 8d inwardly at the bottom, providing a discharge zone 10d of increasing cross sectional area downwardly. Also in accordance with my acknowledged application I usually provide increasing distances between the successive trays downwardly; this producing clarifying zones of increasing depth. Both the increased cross section of the discharge zones and the greater depths of the clarifying zones tend to overcome the difficulties introduced by the increased amounts of precipitated solids towards the bottom of the clarifier. By these means I am enabled to produce multi-tray clarifiers having trays of substantially equal capacity. In prior art clarifiers the lower trays have invariably had smaller capacities than the upper trays, due to the increased amount of solids which they are required to handle.

I usually allow a considerable depth of solids to build up on the floor of my clarifier. This is to produce a sediment bed of gelatinous sludge through which all incoming solids and liquids must pass, the sludge bed forming a seal with the lowest tray and depending flange. The sludge bed provides an excellent filter or entangling medium to trap any finely divided, suspended solids. When the depth of this sludge bed is correctly controlled, which may be accomplished by a series of sampling pipes at varying heights extending into the clarifying zone, for example, a consistently superior clear liquor is produced. The effect is much like the seeping of water through a bed of sand.

While I have described my invention in some detail various modifications can be made therein without departing from the scope thereof. It is sometimes advisable to provide an enlarged chamber or catch-all at the bottom of the tank for the trapping of broken scraper blades, tools, nuts and bolts, etc. If desired this chamber may be provided with an agitator and also with a manhole for recovery and removal of material lodged therein. The sludge outlet is usually provided with a valve 23 and may be connected to a sludge pump. The upper stilling zone may be provided with some type of foam breaker and, in the case of liquids having troublesome foaming characteristics, a peripheral foam launder may be provided. With some types of liquids it is possible to provide a clear liquor draw-off in the upper stilling zone, usually centrally located. This stilling zone is advantageously made of some depth in order to act as an equalizing chamber to accommodate variations in pumping rate of the liquids, etc. Otherwise such variations are likely to disturb the operation of the clarifier as a whole.

For cleaning the clarifier I may provide flush manholes in the various trays. In the case of large capacity clarifiers it is sometimes advantageous to provide a sufficient distance between the trays and the wall of the tank for a boatswain's chair and a man carrying a hose to be lowered for cleaning purposes. In the case of a 20 foot tank, for example, a distance of from 18 to 24 inches may be provided at the periphery of the trays for this purpose. In this design the discharge zones are usually of sufficient width to eliminate the necessity of stepping the trays inwardly from the top to the bottom of the tank; that is the various discharge zones may be made of the same width.

In the case of liquids causing difficulties by producing foam within the clarifying zones, I sometimes provide small central openings in the trays below the top tray 7. These openings surround the central shaft and are large enough to provide a discharge for foam at this point. This opening performs a second function, namely to prevent the piling up of sediment on the trays adjacent to the central shaft where it cannot be reached by the conventional type of scrapers.

Due to the fact that, in my clarifier, the great bulk of the sediment is deposited adjacent to the openings 22, 22a etc., very little sediment finds its way to the center of the clarifying zones adjacent to the central shaft. Very little sediment is deposited at this point on all trays save the top tray 7. Clear liquor can therefore be drawn off from practically any centrally located point of the clarifying zones. When I employ the central openings in the lower trays as described I therefore usually mount the collecting rings within the clarifying zones about midway of their height. The foams rise successively through the lower trays and finally collect beneath the top tray. From this point they may be withdrawn through a special collecting launder, usually in the shape of an annulus, this launder being connected to a pipe leading to a point of disposal. A simpler means for eliminating foam at this point is a single pipe, such as that shown at 24 in Fig. 1 of the drawing. If desired, a foam draw-off can be installed beneath each tray.

The upper tray is usually provided with a special scraper to remove sediment from the dead space adjacent to the central shaft. This may take the form of a chain or a special plow blade.

My new design clarifiers, may be made to cover a great range of capacities. Both the heights of the tanks as well as their diameters may be varied greatly. The prior art counter-flow type of clarifier is greatly limited as to the number of trays which can be employed. When handling liquors containing a high percentage of solids no more than about 4 trays can be employed and, even in the case of a four tray clarifier, the bottom tray is capable of only a strictly limited discharge of clear liquor. In my design, employing discharge zones of increasing cross section and clarifying zones of increasing depth downwardly, there is no such limitation. Practically double the number of trays can be employed in the new design. This fact greatly increases the flexibility of design. For an increase in capacity the height of the tank and its number of trays may be increased, or the diameter can be increased with use of the same number of trays. For a 20 foot clarifier I usually employ about 7 trays, the distances apart varying from about 2 feet for the two top trays to 3 or 4 feet for the distance from the bottom of the tank to lowest tray. The discharge zones may vary in width correspondingly, varying from about 2 inches to 24 inches at the lowest zone.

The flanges depending from the trays of my clarifier can be made vertical or they can be sloped inwardly or outwardly. An inwardly sloping flange is superior to one sloping outwardly. The latter tend to collect sediment which may pile up and even bridge across the discharge zones. An inwardly sloping flange has other important advantages set out at length in my acknowledged copending application.

The trays of the present invention are formed of superimposed bell shaped members which define a plurality of peripheral discharge zones and a plurality of central clarifying zones. At least one (usually the lowest) of these bell shaped members is provided with a constricted mouth, thereby forming a peripheral discharge zone of increasing cross sectional area downwardly and a clarifying zone of increasing cross sectional area upwardly.

In my new design, due to the extremely slow motion of liquid through the entrances 22 to the clarifying zones, it is possible to allow a considerable distance between the top of one tray and the depending flange of the tray above without reducing the capacity of the clarifier. Such a construction also provides sufficient room beneath the flanges 8, 8a etc., for the clear liquor draw-offs. That is, these draw-offs may be run through the entrances 22 to the clarifying zones as shown in Fig. 1. It is, of course, possible to pass the clear liquor draw-offs through the flanges but the other construction offers advantages.

In one modification of my clarifier I employ a hollow tube in place of the shaft 17, using this tube as a clear liquor draw-off. A series of staggered openings in this tube are provided in each clarifying zone and the clear liquor runs downwardly through a stuffing box at the lower end and into a clear liquor conduit. Collars are provided on the tube to close any desired portion of the staggered openings. These openings are made smaller in the lower clarifying zones to provide substantially equal rates of discharge from each zone. It is of course possible to employ a combination of several individual clear liquor draw-offs with a central tube which acts as a draw-off for the remaining trays. The central tube draw-off is more suitable for handling the upper trays, while the individual draw-offs are somewhat more satisfactory for the lower trays.

While I have enumerated a number of variations in design which can be employed in my clarifier, there are numerous other modifications which will be immediately evident to those skilled in the art and which are included within the scope of the following claims. These modifications I consider within the purview of the present invention.

What I claim is:

1. In apparatus for separating solids from liquids, a tank provided with an inlet for liquids containing suspended matter, a plurality of superimposed bell shaped members closed at the top defining an upper stilling zone, a plurality of peripheral discharge zones and a plurality of central clarifying zones; means within said clarifying zones for removing clear liquor and means for withdrawing precipitated solids at the bottom of said tank; at least one of said bell shaped members having a constricted mouth, thereby forming a peripheral discharge zone of increasing cross sectional area downwardly.

2. In the separation of solids from liquids, the process which comprises introducing a stream of liquid to be clarified into a stilling zone, passing said liquid downwardly through a plurality of peripheral discharge zones, passing portions of said liquid upwardly through peripheral openings and centrally into a plurality of central clarifying zones of increasing depth from zone to zone downwardly to centrally located clear liquor draw-offs and with-drawing precipitated solids from beneath said discharge and said clarifying zones in a direction counter to the flow of said liquid.

3. In the separation of solids from liquids, the process which comprises introducing a stream of liquid to be clarified into a stilling zone, passing said liquid downwardly through a plurality of peripheral discharge zones in series, passing portions of said liquid upwardly through peripheral openings and centrally into a plurality of central clarifying zones to centrally located clear liquor draw-offs and with-drawing precipitated solids from beneath said discharge and said clarifying zones in a direction counter to the flow of said liquids; at least one of said clarifying zones being of increasing cross sectional area upwardly and at least one of said discharge zones being of greater cross sectional area than the preceding discharge zone over its entire extent.

4. In the separation of solids from liquids, the process which comprises introducing a stream of liquid to be clarified into a stilling zone, passing said liquid downwardly through a peripheral discharge zone, passing a portion of said liquid upwardly through a peripheral opening into a central clarifying zone to a central clear liquor discharge, passing the remainder of said liquid, together with solids precipitated within said clarifying zone, downwardly through a second peripheral discharge zone of increasing cross sectional area downwardly, passing a portion of said remaining liquid upwardly through a second peripheral opening into a second central clarifying zone of increasing cross sectional area upwardly to a clear liquor discharge and withdrawing precipitated solids from beneath said discharge and said clarifying zones in a direction counter to the flow of said liquid.

5. In apparatus for separating solids from liquids, a tank, means for separating said tank into an upper stilling zone, a plurality of superimposed clarifying zones of increasing depth from zone to zone downwardly, and a plurality of peripheral discharge zones; means for withdrawing clear liquor centrally located within said clarifying zones and means for discharging precipitated solids from said tank.

6. In apparatus for separating solids from liquids, a tank provided with an inlet for liquids containing suspended matter, a plurality of superimposed bell shaped members closed at the top defining an upper stilling zone, a plurality of peripheral discharge zones and a plurality of central clarifying zones; means within said clarifying zones for removing clear liquor and means for withdrawing precipitated solids at the bottom of said tank; the lowest of said bell shaped members being provided with a constricted mouth, thereby forming a clarifying zone of increasing cross sectional area upwardly.

7. In an apparatus for clarifying liquors from suspended solids, a tank, a plurality of superimposed trays centrally mounted in said tank having diameters smaller than that of said tank and being provided with peripheral flanges depending close to the tops of the next lower trays, said trays being closed at the top being substantially horizontal but sloping slightly downwardly towards their periphery and defining a plurality of central clarifying zones and a peripheral discharge zone for solids, the spaces left between said flanges and said trays providing the sole entrance for liquor to be clarified into said clarifying zones, means for introducing liquor to be clarified into the tank above said trays, means for withdrawing clarified liquor mounted centrally at the upper part of said clarifying zones, means for mechanically propelling solids precipitated on said trays peripherally along the surface of said trays through said entrances and into said discharge zones in counter flow to the liquor passing through said entrances and means for withdrawing sludge from the bottom of said tank.

JOHN J. SEIP.